United States Patent
Mukai et al.

(10) Patent No.: US 6,171,676 B1
(45) Date of Patent: *Jan. 9, 2001

(54) MAGNETIC RECORDING MEDIUM CONTAINING FINE MAGNETIC CRYSTAL GRAINS AND ITS MANUFACTURE

(75) Inventors: Ryoichi Mukai; Kazunori Yamanaka; Kazuo Kobayashi, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/800,916

(22) Filed: Feb. 13, 1997

(30) Foreign Application Priority Data

Mar. 19, 1996 (JP) .................................... 8-063434

(51) Int. Cl.[7] ....................................... G11B 5/66

(52) U.S. Cl. .................. 428/65.3; 428/65.5; 428/141; 428/336; 428/694 T; 428/694 TS; 428/694 TR; 428/694 TM; 428/900; 427/128; 427/129; 427/130; 427/131

(58) Field of Search .................. 428/141, 236, 428/694 T, 694 TS, 694 TR, 694 TM, 900, 65.3, 65.5; 427/128, 129, 130, 131

(56) References Cited

U.S. PATENT DOCUMENTS

| | | | |
|---|---|---|---|
| 4,645,690 | 2/1987 | Murakami et al. | 427/128 |
| 5,030,494 | 7/1991 | Ahlert et al. | 428/65.5 |
| 5,062,938 | 11/1991 | Howard | 204/192.2 |
| 5,227,212 | 7/1993 | Ahlert et al. | 360/97.01 |
| 5,413,835 * | 5/1995 | Ikeda | 428/141 |
| 5,436,047 | 7/1995 | Howard et al. | 428/64.2 |
| 5,452,163 | 9/1995 | Coffey et al. | 360/324 |
| 5,585,196 * | 12/1996 | Inomata | 428/557 |
| 5,738,929 * | 4/1998 | Maede | 428/141 |

FOREIGN PATENT DOCUMENTS

| | | |
|---|---|---|
| 0412222 * | 2/1991 | (EP) . |
| 0 412 222 A2 | 2/1991 | (EP) . |
| 0452876 * | 10/1991 | (EP) . |
| 0 452 876 A2 | 10/1991 | (EP) . |
| 0629998 * | 12/1994 | (EP) . |
| 0 629 998 A2 | 12/1994 | (EP) . |
| 63-11277 | 1/1988 | (JP) . |
| 1-14723 | 1/1989 | (JP) . |
| 3-69018 | 3/1991 | (JP) . |
| 3245322 * | 10/1991 | (JP) . |
| 3-241526 | 10/1991 | (JP) . |
| 3-245322 | 10/1991 | (JP) . |
| 6-309648 | 11/1994 | (JP) . |
| 758375 * | 3/1995 | (JP) . |
| 7-58375 | 3/1995 | (JP) . |
| 7-296380 | 11/1995 | (JP) . |

OTHER PUBLICATIONS

European Patent Office Communication with attached European Search Report for European Patent Application No. 97300834.5 dated Apr. 25, 1997.

* cited by examiner

*Primary Examiner*—Leszek Kiliman
(74) *Attorney, Agent, or Firm*—Armstrong, Westerman, Hattori, McLeland & Naughton

(57) ABSTRACT

A magnetic recording medium has a substrate of a disk shape having a non-magnetic surface and a through hole formed at the central area of the substrate, and a plurality of dispersed island regions made of magnetic material and directly formed on the non-magnetic surface. The size of each of the island regions is a single magnetic domain size or finer of the magnetic material. The island regions are formed by cohering atoms of a magnetic film formed by sputtering.

24 Claims, 4 Drawing Sheets

MAGNETIC RECORDING MEDIUM CONTAINING FINE MAGNETIC CRYSTAL GRAINS AND ITS MANUFACTURE

BACKGROUND OF THE INVENTION a) Field of the Invention

The present invention relates to a magnetic recording medium used with a hard disk drive or the like for storing information by changing magnetization states and to its manufacture, and more particularly to a magnetic recording medium of low noises and its manufacture suitable for suppressing noises to be generated when information is read from the medium.

b) Description of the Related Art

For low noise magnetic recording of a magnetic recording medium used with a magnetic disk drive, it is desired that the size of each magnetic grain of the magnetic film is a single magnetic domain size or finer and to make magnetic interaction between magnetic grains substantially negligible. The single magnetic domain size is defined by a maximum size of magnetic material allowing the material to generate only a single magnetic dipole.

Conventionally, non-magnetic material is added to magnetic material of a magnetic film of a polycrystal structure, and precipitated on the crystal grain boundaries after the magnetic film is formed in order to isolate each crystal grain. In order to make a crystal grain finer, an underlying layer is made thin and crystallized finer, and a magnetic film is hetero-epitaxially grown on the underlying layer.

With the conventional method, non-magnetic material is required to be precipitated at crystal grain boundaries. However, precipitation is likely to be hindered and in many cases non-magnetic material remains in crystal grains more than a solubility limit. This non-magnetic material contained in crystal grains more than a solubility limit lowers a coercive force of crystal grains. If the underlying layer is made thin, it becomes difficult to obtain crystal orientation with excellent magnetic characteristics.

SUMMARY OF THE INVENTION

It is an object of the present invention to provide a magnetic recording medium and its manufacture, the magnetic recording medium having fine crystal grains of magnetic material on a substrate and providing a high recording density and low noises.

According to one aspect of the present invention, there is provided a magnetic recording medium comprising: a substrate of a disk shape having a non-magnetic surface and a through hole formed at the central area of the substrate; and a plurality of dispersed island regions made of magnetic material and directly formed on the non-magnetic surface.

According to another aspect of the present invention, there is provided the magnetic recording medium, wherein a size of each of the island regions is a single magnetic domain size or finer of the magnetic material.

If the size of each island region is a single magnetic domain size or finer, only one magnetic dipole is generated in one island region. Since a plurality of magnetic dipoles will not cancel one another, low noise and high density magnetic recording is possible.

According to another aspect of the present invention, there is provided the magnetic recording medium, the non-magnetic surface is irregular.

Crystals of a hexagonal system have a strong tendency of growing with the c-axis being oriented to the direction vertical to the underlying surface. Therefore, the c-axis of crystals growing on the slanted surface of the irregular substrate does not orient vertical to the substrate surface. If the c-axis is an easy-to-magnetize axis, this easy-to-magnetize axis does not intersect with the substrate plane at a right angle, which is suitable for magnetization in the substrate in-plane direction.

According to another aspect of the present invention, there is provided the magnetic recording medium, further comprising at least one laminated structure including a separation layer made of non-magnetic material and covering at least the surfaces of the island regions and other island regions made of magnetic material and dispersed on the surface of the separation layer.

The distribution density of island regions can be raised by forming a plurality of island region layers.

According to another aspect of the present invention, there is provided a method of manufacturing a magnetic recording medium comprising the steps of: preparing a substrate with a non-magnetic surface; and forming dispersed island regions made of magnetic material and formed on the non-magnetic surface of the substrate.

According to another aspect of the present invention, there is provided the method, wherein the island region forming step includes the steps of: forming a magnetic film made of magnetic material on the non-magnetic surface of the substrate; and cohering atoms of the magnetic film by subjecting the substrate to a heat treatment after the magnetic film is formed on the non-magnetic surface.

According to another aspect of the present invention, there is provided the method, further comprising, after the island region forming step, the steps of: forming a separation layer made of non-magnetic material and covering at least the surfaces of the island regions; and forming, after the separation layer forming step, other island layers of magnetic material and dispersed on the uppermost surface of the substrate.

According to the present invention, crystal grains of magnetic material are formed to be dispersed on the substrate surface. If each fine crystal grain has the size of a single magnetic domain size or finer and magnetic interaction between adjacent fine crystal grains is almost negligible, low noise magnetic recording is possible.

DETAILED DESCRIPTION OF THE PREFERRED EMBODIMENTS

A manufacture method for a magnetic recording medium according to the first embodiment of the invention will be described with reference to FIGS. 1A to 1C.

Figure 1A:
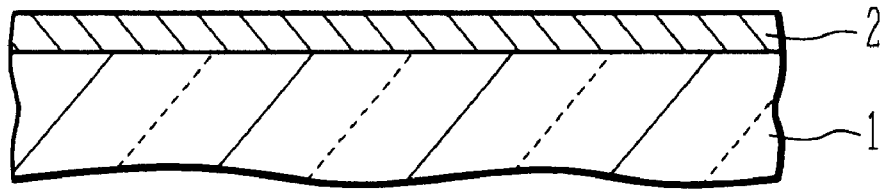
FIGS. 1A to 1C are cross sectional views of a substrate illustrating a manufacture method for a magnetic recording medium according to a first embodiment of the invention.

As shown in FIG. 1A, on the surface of a substrate 1 a magnetic film 2 is formed. For example, the substrate 1 is made of single crystal silicon, glass, quartz, zirconia (ZrO$_2$), carbon, or the like, and the magnetic film 2 is made of Fe, Co, Ni, rare earth metal, alloy of these metals, or the like. The magnetic film 2 is formed by DC magnetron sputtering by using Ar as sputtering gas and a source metal plate as a target under the conditions of a room temperature as a growth temperature, a pressure of 3 mTorr, and an input power of 500 W. It is preferable to set the thickness of the magnetic film 2 to 8 nm or thinner as will be later described. It is also preferable that the magnetic film 2 contains 70 mol % or large of Fe, Co, Ni, or rare earth metal.

After the magnetic film 2 is formed, introduction of Ar gas is stopped and the substrate 1 is subjected to heat treatment while the sputtering chamber is maintained vacuum. It is not necessarily required to maintain the vacuum, but a nonoxidizing atmosphere may be used.

Figure 1B:
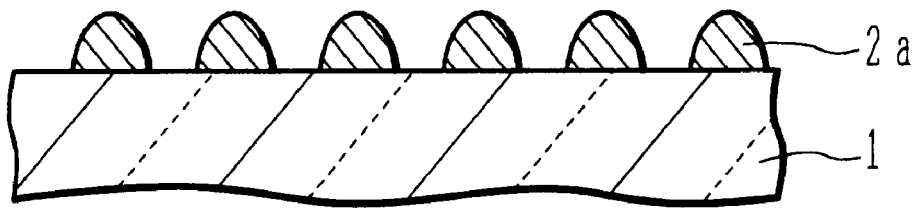

FIG. 1B is the cross sectional view of the substrate after the heat treatment. With the heat treatment, atoms of the magnetic film 2 move along the surface of the substrate 1 and cohere to form island regions 2a made of the magnetic material. The island regions 2a are dispersed over the whole surface of the substrate 1 and isolated from each other.

If the thickness of the magnetic film 2 is made thicker than 8 nm in the process illustrated in FIG. 1A, island regions become hard to be formed during heat treatment. It is therefore preferable to set the thickness of the magnetic film 2 to 8 nm or thinner.

The temperature of heat treatment is set to a temperature at which atoms of the magnetic film 2 can cohere. The heat treatment temperature for the magnetic film 2 made of Fe or Ni is preferably 300 to 500° C., or more preferably 400 to 500° C.

The heat treatment temperature for the magnetic film 2 made of Co is preferably 300 to 450° C., or more preferably 400 to 450° C. At the heat treatment temperature higher than 450° C., crystal modification of Co occurs changing from a hexagonal system to a cubic system. For magnetic recording, Co of a hexagonal system having magnetic anisotropy of crystals is more preferable. Therefore, the heat treatment temperature is preferably set to 450° C. or lower. If the material whose magnetization characteristics are changed by crystal modification during heat treatment is to be used, the heat treatment is performed in a temperature range which provides a crystal structure showing desired magnetization characteristics.

If the surface of the magnetic film 2 is oxidized during heat treatment, a smooth motion of atoms in the magnetic film 2 along the surface of the substrate 1 is hindered. In order to make it easy to form island regions 2a, it is therefore preferable to perform the heat treatment in a vacuum atmosphere or in an non-oxidizing atmosphere.

Figure 1C:
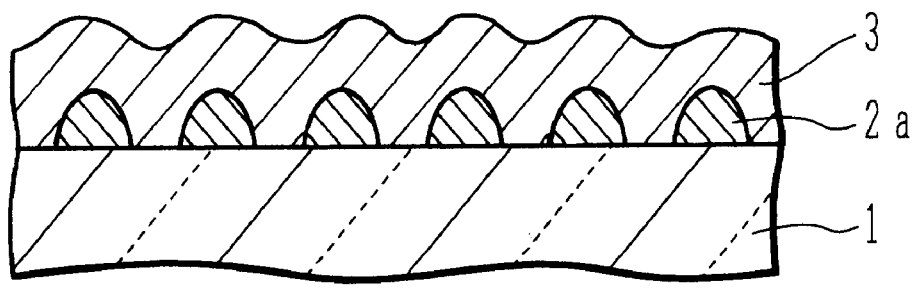

As shown in FIG. 1C, a protective film 3 of, for example, carbon is formed to a thickness of 10 to 20 nm, covering the island regions 2a and the exposes surface of the substrate 1. The carbon protective film 3 is formed by RF magnetron sputtering under the conditions of, for example, a pressure of 3 mTorr and an input power of 300 W.

With this embodiment method, Co was used as the material of the magnetic film 2, the film thickness was set to 4 nm, and heat treatment was performed at 450° C. Under these conditions, it was possible to form island regions 2a. The size of each island region 2a along the substrate in-plane was about 10 nm, and the shortest distance between adjacent island regions 2a was about 10 nm. Since the island size is about the single magnetic domain size, only a single magnetic dipole is generated in each island region 2a. Since the distance between adjacent island regions 2a is about 10 nm, it can be considered that there is substantially no magnetic interaction between adjacent island regions. Non-magnetic material is not contained in each island region 2a so that good magnetic characteristics can be obtained.

If the size of the island region 2a is made too small, a super paramagnetic state is generated and magnetic dipoles are lost by thermal fluctuation. It is therefore preferable to increase the size of each island region 2a larger than the size at which the super paramagnetic state is generated. In the case of Co, the size is preferably set to 5 nm or larger.

The surface of the protective film 3 is slightly irregular because of the unevenness of the underlying surface. It is therefore possible to weaken an attraction force of the atomic force between a magnetic head and a magnetic recording medium. While a magnetic recording medium stops in a hard disk drive, the magnetic head is in contact with the surface of the protective film 3, and while it rotates, the magnetic head hovers slightly over the surface of the protective film 3. By weakening the attraction force between the magnetic head and magnetic recording medium, the magnetic head becomes easy to hover.

In the first embodiment, the magnetic film 2 is formed at a room temperature, and atoms of the magnetic film 2 are made to cohere at the later heat treatment. The substrate may be heated while the magnetic material is deposited by sputtering. If the substrate is heated during sputtering, atoms on the substrate surface become easy to migrate. Therefore, both deposition of magnetic material on the substrate surface and coherence of atoms can be performed generally at the same time.

Island regions may be therefore formed without heat treatment after sputtering. The substrate surface during sputtering may be set to about the same temperature as the heat treatment temperature.

In the above embodiment, the grain size of each island region is about the single magnetic domain size. The grain size may be made larger than the single magnetic domain size. If two bits are recorded in one island region, two magnetized regions interact with each other and noises may be generated. It is therefore preferable to set the size of an island region smaller than one bit record area. For example, in order to realize a record density of 10 G bits/inch$^2$ (1.55 G bit/cm$^2$), the grain size of each island region is preferably set to 0.2 μm or smaller.

A manufacture method for a magnetic recording medium according to the second embodiment will be described with reference to FIGS. 2A and 2B. In the first embodiment, the surface of a substrate is flat, whereas in the second embodiment, the surface of a substrate is irregular.

Figure 2A:
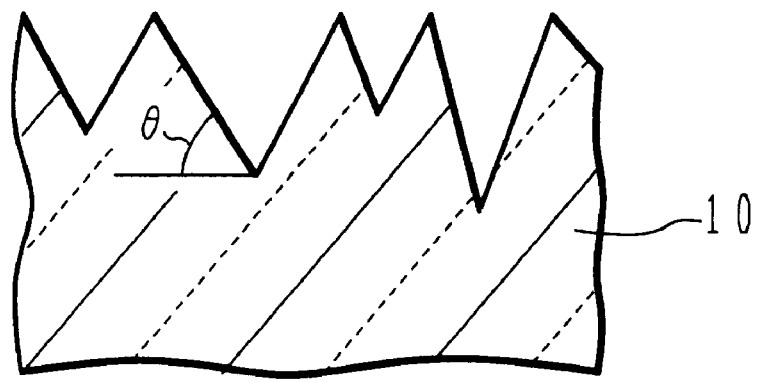
FIGS. 2A and 2B are cross sectional views of a substrate illustrating a manufacture method for a magnetic recording medium according to a second embodiment of the invention.

A substrate 10 made of non-magnetic material is prepared which has such an irregular surface as shown in FIG. 2A. This irregular surface may be formed by abrading it with suitable abrasive material. The height of irregularity is preferably set to about 10 nm generally the same as the bottom diameter of an island region of magnetic material to be formed at a later process, and to about 30 nm or lower which corresponds to a hover gap of a magnetic head.

The concave side wall on the irregular surface is preferably formed to have a slanted surface having a slanted angle θ of 30 to 90 degree relative to the substrate surface (relative to a virtual flat surface planarized to remove irregularity). The height of irregularity and the slanted angle θ change with the diameter and material of abrasive powder, the pressure of abrasion, the number of revolutions, emulsion, and the like. The height of irregularity and the slanted angle θ are also influenced by the substrate material. It is therefore preferable to determine suitable abrasion conditions after experiments are made under a variety of conditions.

Figure 2B:
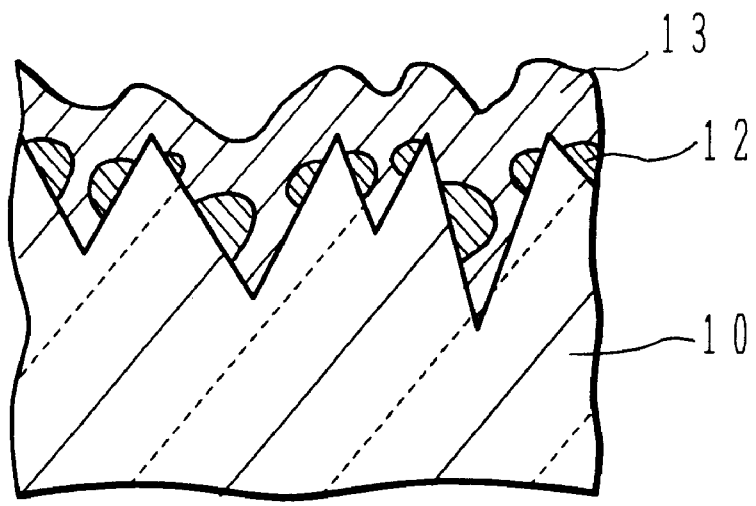

As shown in FIG. 2B, island regions 12 made of Co are formed on the surface of the substrate 10. The island regions are formed in the same manner as the first embodiment. A Co film may be deposited by sputtering at a room temperature to thereafter perform heat treatment, or Co may be deposited by sputtering while the substrate is heated.

After the island regions 12 are formed, a protective film 13 made of carbon or the like is deposited to cover the island regions 12.

If a Co film is deposited on an amorphous substrate, the (0 0 1) plane becomes likely to grow. In other words, a c-axis which is an easy-to-magnetize axis of Co has a strong tendency to orient vertical to the substrate surface. For magnetic recording with magnetization along the substrate in-plane, it is preferable to grow a Co film whose c-axis is aligned in parallel to the substrate plane. If a Co film is grown on a flat surface, the c-axis becomes vertical to the substrate plane and the direction to be magnetized becomes vertical to the easy-to-magnetize axis, which is not suitable for magnetic recording.

As shown in FIG. 2B, if after the surface of the substrate 10 is made irregular, the island region 12 is grown on the slanted surface on the irregular substrate, the c-axis of Co in each island region becomes vertical to the corresponding slanted surface. Therefore, the c-axis crosses the substrate plane at an angle smaller than 90 degree. Since the c-axis direction contains substrate in-plane components, magnetization in the substrate in-plane is easy.

It can be empirically considered that an angle between the c-axis of Co and the substrate plane is preferably about 30 degree. It is therefore preferable to set the slanted angle θ of the slanted surface on the irregular substrate to about 60 degree. Such advantages are expected also at the slanted angle θ of 30 to 90 degree.

In FIGS. 2A and 2B, Co is used as magnetic material. Such advantages are expected for other materials if they have magnetic anisotropy of crystals and the easy-to-magnetize axis thereof has a tendency to orient vertical to the underlying surface.

Figure 3A:
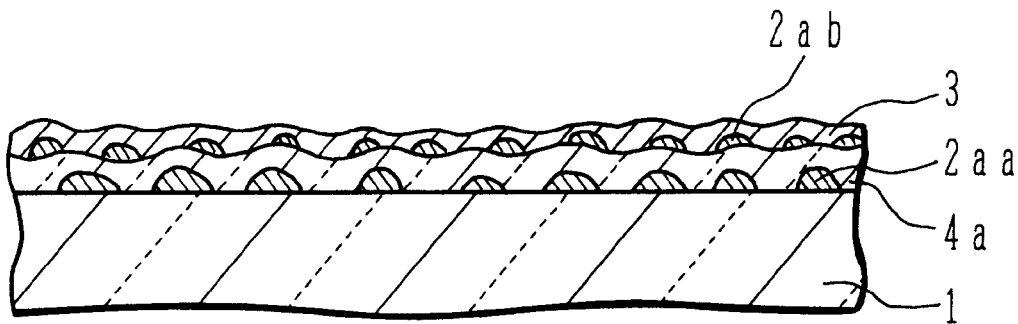
FIGS. 3A and 3B are cross sectional views of a substrate illustrating structures of magnetic recording mediums according to a third embodiment of the invention and a modification of the third embodiment.

Next, a magnetic recording medium according to the third embodiment will be described with reference to FIGS. 3A and 3B. As shown in FIG. 3A, island regions 2*aa* of magnetic material are formed on the surface of a substrate 1 made of non-magnetic material. The island regions 2*aa* are formed in the same manner as described with the first embodiment.

Next, a separation layer 4*a* of $SiO_2$ is formed to a thickness of 10 nm, covering the surfaces of the island regions 2*aa* and the exposed surface of the substrate 1. The separation film 4*a* is formed, for example, by RF magnetron sputtering using mixed gas of Ar and $O_2$ of a partial pressure ratio of 1:1 as sputtering gas and a $SiO_2$ plate as a target, under the conditions of a pressure of 0.1 Pa to 5 Pa and an input power of 100 to 200 W.

On the surface of the separation layer 4*a*, island regions 2*ab* of magnetic material are formed in the same manner as the first embodiment. The surfaces of island regions 2*ab* and separation layer 4*a* are covered with a protective layer 3 made of carbon or the like.

The thickness of the separation layer 4*a* is determined such that upper and lower island regions do no magnetically interact with each other. For example, the thickness of the separation layer 4*a* is preferably set to 10 nm or thicker.

As shown in FIG. 3A, the lamination of two layers of magnetic material island regions with the separation layer 4*ab*eing interposed therebetween increases the distribution density of island regions along the substrate in-plane. It is therefore possible to raise the record density.

In FIG. 3A, the lamination of two island layers is used. Three or more island layers may be used. Also in the third embodiment, $SiO_2$ is used as the separation layer. Other non-magnetic materials such as $CrO_2$ and $ZrO_2$ may be used.

Figure 3B:
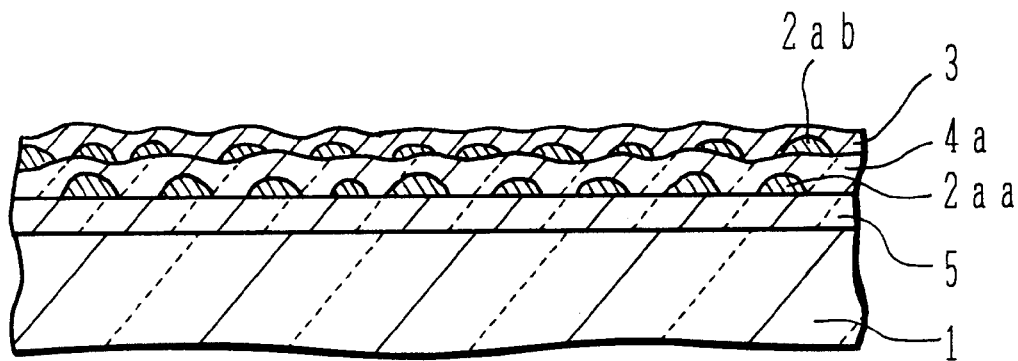

FIG. 3B is a cross sectional view of a magnetic recording medium according to a modification of the third embodiment. A non-magnetic layer 5 is formed on the surface of a substrate 1, and island regions 2*aa* are formed on the surface of the non-magnetic layer 5. The other structures are the same as those of the magnetic recording medium shown in FIG. 3A.

The non-magnetic layer 5 is made of, for example, $SiO_2$, carbon, and metal oxide such as $TiO_2$. Since the nonmagnetic layer 5 is interposed between the substrate 1 and island regions 2*aa*, atoms constituting the substrate 1 and island regions 2*aa* can be suppressed from being mutually diffused.

In FIGS. 3A and 3B, the surface of the substrate 1 is generally flat. If magnetic material having magnetic anisotropy of crystals is used, the surfaces of the substrate 1 or nonmagnetic layer 5 may be made irregular as shown in FIG. 2A.

Figure 4:
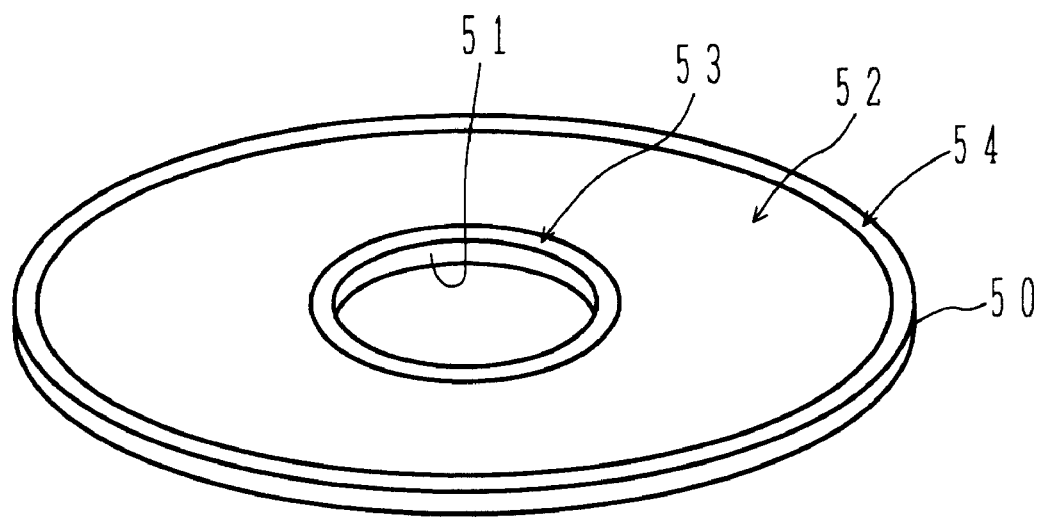
FIG. 4 is a perspective view showing an example of a magnetic recording medium.

FIG. 4 is a perspective view showing an example of a magnetic recording medium. A magnetic material layer is formed in an area 52 of a disk 50 having a central through hole 51, excepting the opposite peripheral areas 53 and 54 of both sides of the disk. A three-point flexural strength of the disk 50 is preferably 50 MPa or larger. The disk 50 is clamped at the inner peripheral area 53 to mount it on the rotary shaft of a disk drive. When magnetic material is deposited by sputtering, the disk 50 is clamped at the outer peripheral area 54 to hold it in a sputtering system.

The area 52 of the disk 50 has a cross section such as shown in FIGS. 1C, 2B, 3A, or 3B. The magnetic material has crystal grains each having a single magnetic domain size or smaller and being isolated to the extent that the grains do not magnetically interact with each other. Therefore, low noise magnetic recording is possible.

The present invention has been described in connection with the preferred embodiments. The invention is not limited only to the above embodiments. It is apparent to those skilled in the art that various modifications, improvements, combinations and the like can be made without departing from the scope of the appended claims.

What is claimed is:

1. A magnetic recording medium comprising:
   a substrate of a disk shape having a non-magnetic surface and a through hole formed at the central area of said substrate;
   a plurality of randomly dispersed island regions of magnetic material which are formed on the non-magnetic surface and isolated from each other; and
   a protective film made of carbon, said protective film covering said island regions.

2. A magnetic recording medium according to claim 1, wherein a size of each of said island regions is a single magnetic domain size or finer of the magnetic material.

3. A magnetic recording medium according to claim 1, wherein the non-magnetic surface is irregular.

4. A magnetic recording medium according to claim 3, wherein a slanted angle of a slanted surface of said irregular non-magnetic surface is 30 to 90 degrees.

5. A magnetic recording medium according to claim 1, wherein said island regions are made of one of magnetic materials selected from a group consisting of Fe, Co, Ni, rare earth metal, and alloy containing these metals as main compositions.

6. A magnetic medium according to claim 1, further comprising other island regions made of magnetic material and dispersed on the surface of the protective film.

7. A magnetic recording medium according to claim 1, wherein said substrate is made of one of non-magnetic materials selected from a group consisting of single crystal silicon, glass, quartz, carbon, and zirconia.

8. A magnetic recording medium according to claim 1, wherein said substrate includes:

an underlying substrate with an upper surface; and a non-magnetic material layer formed on the upper surface of said underlying substrate and made of one of non-magnetic materials selected from a group consisting of silicon oxide, carbon, and metal oxide.

9. A method of manufacturing a magnetic recording medium comprising the steps of:

preparing a substrate with a non-magnetic surface; forming a magnetic film made of magnetic material on the non-magnetic surface;

cohering atoms of the magnetic film by subjecting the substrate to a heat treatment after the magnetic film is formed on the non-magnetic surface, whereby forming dispersed island regions of magnetic material which are formed on the non-magnetic surface and isolated from each other; and forming a protective film made of carbon covering the dispersed island regions.

10. A method according to claim 9, wherein a thickness of the magnetic film formed by said magnetic film forming step is 8 nm or thinner.

11. A method according to claim 9, wherein the magnetic film is made of Co, and said cohering step performs heat treatment of the substrate at 300 to 450° C.

12. A method according to claim 9, wherein the magnetic film is made of Fe or Ni, and said cohering step performs heat treatment of the substrate at 300 to 500° C.

13. A method of manufacturing a magnetic recording medium comprising the steps of:

preparing a substrate with a non-magnetic surface of a disk shape having a non-magnetic surface and a through hole formed at the central area of said substrate; and depositing magnetic material on the non-magnetic surface of the substrate by sputtering while a substrate temperature is maintained at 300° C. or higher whereby dispersed island regions of magnetic material are formed on the non-magnetic surface and isolated from each other.

14. A method according to claim 13, wherein said island regions are made of Co, and said depositing step deposits Co at the substrate temperature of 300 to 450° C.

15. A method according to claim 13, wherein said island regions are made of Fe or Ni, and said depositing step deposits Fe or Ni at the substrate temperature of 300 to 500° C.

16. A method according to claim 9, wherein the magnetic material of the island regions has magnetic anisotropy of crystals and a magnetic susceptibility in the direction perpendicular to a growth surface smaller than that in the direction of a growth in-plane, and the method further comprises the steps of:

making the non-magnetic surface of the substrate irregular after said substrate preparing step and before said island regions forming step; and forming said island regions on slanted surface of the irregular surface of the substrate.

17. A method according to claim 16, wherein a slanted angle of a slanted surface of the irregular surface formed by said irregular surface forming step is 30 to 90 degree.

18. A method according to claim 9, further comprising, before said island regions forming step, the steps of:

preparing an underlying substrate made of non-magnetic material; and forming a non-magnetic material layer formed on the surface of the underlying substrate and made of one of non-magnetic materials selected from a group consisting of silicon oxide, carbon, and metal oxide.

19. A method according to claim 9, further comprising, after said island regions forming step, the steps of:

forming a separation layer made of non-magnetic material and covering at least the surfaces of the island regions; and forming, after said separation layer forming step, other island regions of magnetic material and dispersed on the uppermost surface of the substrate.

20. A method according to claim 19, further comprising the step of repeating said separation layer forming step and said other island regions forming step.

21. A method according to claim 9 further comprises the step of subjecting the substrate with the magnetic film formed thereon to a heat treatment.

22. A method according to claim 21, wherein said magnetic film forming step forms the magnetic film to a thickness of 8 nm or thinner.

23. A method according to claim 21, wherein said heat treatment step performs a heat treatment of the substrate at a temperature of 300° C. or higher.

24. A method of manufacturing a magnetic recording medium comprising the steps of:

preparing a substrate with a non-magnetic surface;

depositing magnetic material on said non-magnetic surface of said substrate by sputtering while said substrate is heated and maintained at a temperature higher than 300° C., whereby dispersed island regions of magnetic material are formed on the non-magnetic surface and isolated from each other; and forming a protective film made of carbon on said deposited magnetic material.

* * * * *